United States Patent Office 3,390,825
Patented July 2, 1968

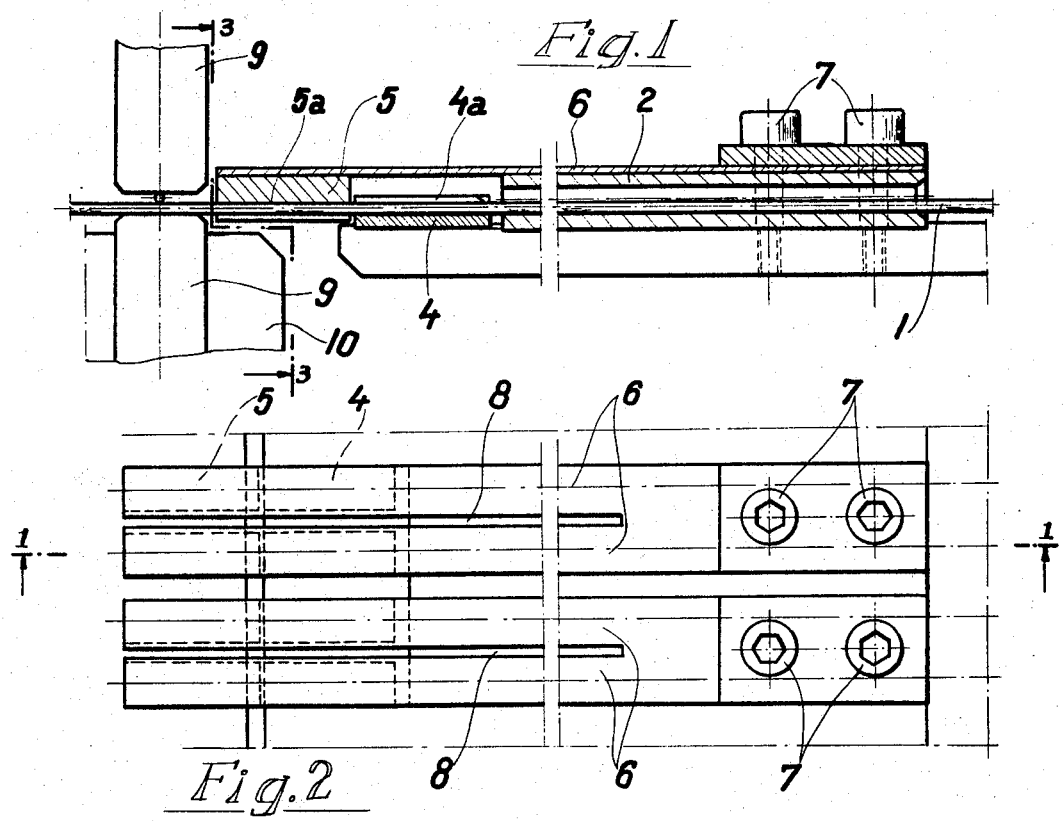
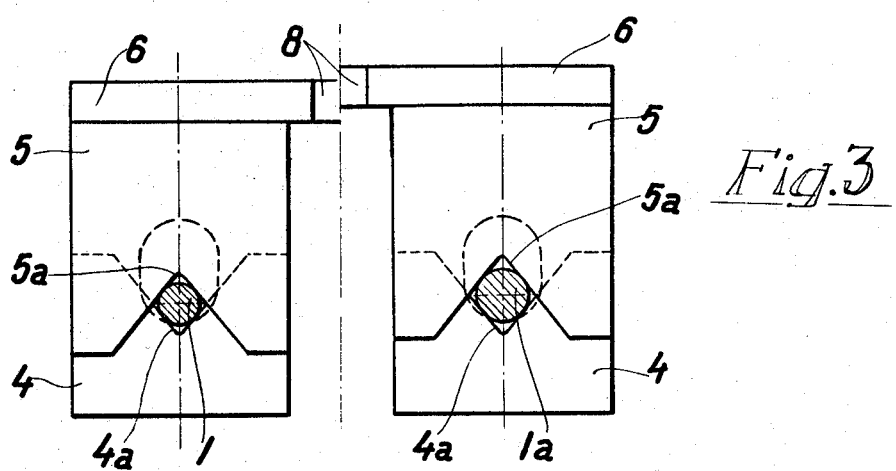

3,390,825
WIRE GUIDING SYSTEM FOR WIRE MESH
WELDING MACHINES
Hans Gott, Graz, Styria, and Josef Ritter, Graz-Kroisbach, Styria, Austria, assignors to EVG Entwicklungs- u. Verwertungsgesellschaft m.b.H., Graz, Styria, Austria, a corporation of Austria
Filed Jan. 30, 1967, Ser. No. 612,447
4 Claims. (Cl. 226—198)

ABSTRACT OF THE DISCLOSURE

A guiding system, for the guiding of longitudinal wires to the electrodes in a wire mesh welding machine, and for holding the longitudinal wires spaced apart for a predetermined distance. The guiding system includes for each wire a guide tube, a V-grooved guide piece, and a resiliently biased hold-down piece that urges the wire into the guide piece for precise wire location.

---

The invention relates to wire mesh welding, and relates more particularly to machine wire mesh welding. Reference is had to our co-pending application Ser. No. 391,163, filed Aug. 21, 1964, now Patent No. 3,307,715. Still more particularly, the invention relates to a guiding system, for use in guiding and in holding spaced apart longitudinal wires that are fed in a wire mesh welding machine to the electrodes of the machine.

In the operation of welding machines used in the manufacture of welded wire mesh, the longitudinal wires are usually fed to the machine continuously being unrolled from storage spools or coils, and they need to be positioned parallel to each other and precisely spaced apart. The group of wires advances intermittently towards the welding electrodes. The transverse wires, previously cut to length, are fed one after the other to the electrodes from the side, and are welded to each longitudinal wire at the crossing places by the electrodes. As the longitudinal wires are fed it is important to guide them precisely as close as possible to the welding places in order to ensure as far as possible that the welds are precisely and evenly spaced apart. The precise spacing is particularly important to achieve when manufacturing wire mesh made of thin wire, because firstly in this case the wire is taken straight from the coil without any straightening operation, and secondly because the size of the mesh is usually small and any irregularities show up conspicuously.

Up to now guide tubes reaching near to the welding point have been used for guiding the longitudinal wires but although these tubes do serve their purpose it is necessary to use a different set of guide tubes for each diameter of longitudinal wire being welded, because the internal tube diameter must exactly correspond to the diameter of the wire. If one were to use only tubes of sufficient internal diameter to accommodate the thickest wire one would obtain a great inaccuracy in guiding the thinnest wire, just where accuracy is most important. The consequence is that using guide tubes it is necessary to mount a different set of tubes on the machine each time the production program calls for a different diameter of wire, with resulting loss of time and increased production costs.

It is accordingly among the principal objects of the invention to provide a guiding system for wire mesh welding machines that overcomes the difficulties of the prior art. It is another object of the invention to provide a guiding system for the guiding of the longitudinal wires as they are fed in a wire mesh welding machine and for holding them spaced apart in order to locate them precisely in predetermined position.

It is a further object of the invention to provide a guiding system of the aforesaid type that will guide the longitudinal wires in the wire mesh welding machine in precise position irrespective of the size of the longitudinal wires.

Further objects and advantages of the invention will be set forth in part in the following specification and in part will be obvious therefrom without being specifically referred to, the same being realized and attained as pointed out in the claims hereof.

Broadly speaking, this is accomplished in accordance with the invention by providing a guide system in a wire mesh welding machine that comprises for each wire a guide tube, a guide piece having a guide groove of substantially V-shaped cross-section and a spring-loaded hold-down device that pushes the wire into the groove to locate it precisely on its passage between the tube and the electrode.

In this way the longitudinal wires are positioned laterally with precision, irrespective of the diameter of the wire. The guide tubes, which guide the wire before the guide pieces, have internal diameters suitable for the thickest wires apt to be welded in the particular machine and serve merely for facilitating the introduction of the wire into the groove of the guide pieces.

The dimensions of such mesh welding machines are usually such that the guide piece cannot be mounted close to the welding electrode because the electrode holder forms an obstruction there. In this case, each hold-down piece is preferably cantilevered beyond the end of the guide tube and is arranged to engage the wire between the guide piece and the electrode. Each hold-down piece may also have a substantially V-shaped groove oriented opposite to that in the guide piece.

For a fuller understanding of the nature and objects of the invention, reference should be had to the following detailed description, taken in connection with the accompanying drawings, in which:

FIG. 1 is a fragmentary elevational view, partly in section taken on the line 1—1 of FIG. 2, of a wire guiding system in accordance with the invention;

FIG. 2 is a fragmentary plan view of part thereof; and

FIG. 3 is a large scale sectional view taken on the line 3—3 of FIG. 1.

In carrying the invention into effect in one of the embodiments which has been selected for illustration in the accompanying drawings and for description in this specification, and referring now particularly to FIGS. 1 and 2, the longitudinal wires 1 are unwound from coils (not shown in the drawing) and each wire 1 is introduced into a guide tube 2, which is adjustably mounted on the machine. Each guide tube 2 is bell-mounted at its inlet. The internal diameters of the guide tubes 2 are a little larger than the diameter of the thickest wire 1 which it is intended to weld on the machine.

A precision guide is situated beyond the outlet end of the guide tube 2, and the essential parts of each precision guide comprise a guide piece 4 which has a guide groove 4a of V-shaped cross-section and a hold-down piece 5. The guide pieces 4 are mounted individually and adjustably on the machine, by means not shown in the drawing, in such a way that each precision guide piece 4 can be positioned in line with its guide tube 2. Alternatively if desired several precision guide pieces 4, or all of them, can be combined as a single part.

The hold-down pieces 5 are located between the guide pieces 4 and the welding electrodes 9 that are retained in holders 10. The hold-down pieces 5 are attached to resilient supporting spring tongues 6 made of spring steel. In order to simplify the mounting of screws 7, the hold-down pieces 5 and the spring tongues 6 are arranged in groups of two or more, as shown in FIG. 2, with elongated slots 8 between each two spring tongues 6 to allow each tongue 6 to adapt its position independently.

It is not possible to bring the precision guide pieces 4 right up to the electrodes 9 because the electrode holders 10 get in the way; therefore the spring 6 extend out beyond the precision guide pieces 4 and each hold-down piece 5 has a guide groove 5a of inverted V-shaped cross-section. In operation, the V-groove 5a accepts and guides in resilient fashion the wire issuing from the precision guide piece 4.

In FIG. 3 two precision guides 4 are shown and two guiding hold-down pieces 5, the guide piece 4 on the left is shown holding a comparatively thin wire 1, whereas the guide on the right holds a thicker wire 1a. It will be seen that the arrangement of the precision guide piece 4 together with the spring mounted hold-down piece 5 ensures a precise and reliable guiding of the wires 1, 1a, irrespective of its diameter.

We wish it to be understood that we do not desire to be limited to the exact details of construction shown and described, for obvious modifications will occur to a person skilled in the art.

Having thus described the invention, what we claim as new and desire to be secured by Letters Patent, is as follows:

1. A guiding system, for use in guiding in a wire mesh welding machine the longitudinal wires for the mesh as each longitudinal wire is fed to an electrode of the machine and holding the longitudinal wires spaced apart for a predetermined distance, comprising for each wire a guide tube sufficiently large to guide the thickest longitudinal wire apt to be used in the machine, a guide piece having a guide groove of substantially V-shaped cross-section supporting the longitudinal wire from below and disposed between said guide tube and the electrode, and a resiliently biased hold-down piece urging the longitudinal wire into said guide piece thereby locating it in precisely predetermined position on its passage between said guide tube and the electrode.

2. A guiding system according to claim 1, in which each hold-down piece is cantilevered beyond the end of the guide tube and is arranged to engage the longitudinal wire between the guide piece and the electrode.

3. A guiding system according to claim 1, in which each hold-down piece also has a substantially V-shaped groove disposed oppositely relative to the V-shaped guide groove of said guide piece.

4. A guiding system according to claim 1, a spring tongue for each longitudinal wire, each hold-down piece being mounted on a spring tongue, said spring tongues being combined together in groups of at least two, the adjacent spring tongues of each group defining an elongated slot operative to allow the hold-down pieces to move independently.

References Cited

UNITED STATES PATENTS 2,953,290   9/1960   Kostenko et al. ____ 226—198 X

ALLEN N. KNOWLES, *Primary Examiner.*